(12) United States Patent
Rathonyi et al.

(10) Patent No.: US 8,538,413 B2
(45) Date of Patent: Sep. 17, 2013

(54) NETWORK LAYER TEST MODULE FOR TESTING CONTROL CHANNELS AND UNIDIRECTIONAL RADIO BEARERS

(75) Inventors: Bela Rathonyi, Lomma (SE); Leif Mattisson, Sodra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1780 days.

(21) Appl. No.: 11/675,881

(22) Filed: Feb. 16, 2007

(65) Prior Publication Data

US 2007/0232291 A1 Oct. 4, 2007

Related U.S. Application Data

(60) Provisional application No. 60/778,441, filed on Mar. 2, 2006, provisional application No. 60/794,742, filed on Apr. 25, 2006.

(51) Int. Cl.
*H04W 24/00* (2009.01)

(52) U.S. Cl.
USPC .................. 455/423; 455/67.11; 455/115.1; 455/226.1

(58) Field of Classification Search
USPC ....... 455/423–425, 67.11–67.7, 115.1–115.4, 455/226.1–226.4; 370/333, 332, 351–356; 379/1.01–35
See application file for complete search history.

(56) References Cited

U.S. PATENT DOCUMENTS

| | | | |
|---|---|---|---|
| 6,542,538 B2 * | 4/2003 | Fischel et al. | 375/224 |
| 6,687,499 B1 * | 2/2004 | Numminen et al. | 455/423 |
| 6,697,604 B1 * | 2/2004 | Rimpela et al. | 455/67.14 |
| 7,430,177 B2 * | 9/2008 | Mir et al. | 370/241 |
| 7,539,489 B1 * | 5/2009 | Alexander | 455/423 |
| 2002/0023243 A1 * | 2/2002 | Tomita | 714/704 |
| 2003/0207696 A1 | 11/2003 | Willenegger et al. | |
| 2004/0253968 A1 * | 12/2004 | Chang et al. | 455/513 |
| 2008/0056198 A1 * | 3/2008 | Charpentier et al. | 370/332 |

FOREIGN PATENT DOCUMENTS

| | | |
|---|---|---|
| EP | 1441554 | 7/2004 |
| JP | 2002538694 A | 11/2002 |
| JP | 2002540746 A | 11/2002 |

(Continued)

OTHER PUBLICATIONS

3GPP TS 22.146: "Multimedia Broadcast/Multicast Service;" v8.1.0 (Sep. 2006), 18 pages. http://www.3gpp.org/ftp/Specs/html-info/22146.htm.

(Continued)

*Primary Examiner* — San Htun

(74) *Attorney, Agent, or Firm* — Coats & Bennett, P.L.L.C.

(57) ABSTRACT

A method and apparatus for testing point-to-multipoint services and other wireless communication services dependent on unidirectional radio bearers and/or unacknowledged mode operations is described herein. A wireless communication device activates a test module responsive to receiving a test activation message. During a test mode, the test module receives RLC data units from a test system via a unidirectional downlink radio bearer or a control channel. In one embodiment, the test module includes a metric evaluator that determines an error metric based on the received RLC data units. The test module reports the error metric to the test system. In another embodiment, the test module includes a loop-back module that loops-back at least a portion of the received RLC data units to the test system via a unidirectional uplink radio bearer.

21 Claims, 7 Drawing Sheets

(56) References Cited

FOREIGN PATENT DOCUMENTS

| | | |
|---|---|---|
| JP | 2004112163 A | 4/2004 |
| TW | 200503467 | 1/2005 |
| WO | 0059249 A1 | 10/2000 |
| WO | WO 00/59249 | 10/2000 |
| WO | WO 02/49372 | 6/2002 |

OTHER PUBLICATIONS

3GPP TS 22.246: "MBMS User Services," v8.2.0 (Dec. 2006), Release 8, 8, 16 pages. http://www.3pp.org/ftp/Specs/html-info/22246.htm.

3GPP TS 25.346: "Introduction of the MBMS in the Radio Access Network (RAN); Stage 2," v7.2.0 (Sep. 2006), Release 7, 60 pages. http://www.3gpp.org/ftp/Specs/html-info/25346.htm.

3GPP TS 25.101: "User Equipment (UE) radio transmission and reception (FDD)," v7.6.0 (Dec. 2006), Release 7, 143 pages. http://www.3gpp.org/ftp/Specs/html-info/25101.htm.

3GPP TS 34-109: "Terminal logical test interface; Special conformance testing functions," v6.2.0 (Sep. 2006), Release 6, 37 pages. http://www.3gpp.org/ftp/Specs/html-info/34109.htm.

3GPP TS 34.121-1: "User Equipment (UE) conformance specification; Radio transmission and reception (FDD); Part 1", v7.3.0 (Release 7), 888 pages. http://www.3gpp.org/ftp/Specs/html-info/34121-1.htm.

3GPP TS 34.123-1: User Equipment (UE) conformance specification; Part 1: Protocol conformance specification, v6.5.0 (Dec. 2006), Release 6, Sections 7.24.2; 7.2.4.3; 8.5; 14.1.5; 14.4.5; 14.4.6; and 14.4.7. http://www.3gpp.org/ftp/Specs/html-info/34123-1.htm.

Search Report for ROC (Taiwan) Patent Application No. 096106991 issued May 2, 2013.

* cited by examiner

US 8,538,413 B2

NETWORK LAYER TEST MODULE FOR TESTING CONTROL CHANNELS AND UNIDIRECTIONAL RADIO BEARERS

This patent claims priority from U.S. Provisional Application No. 60/778,441, filed 2 Mar. 2006, and U.S. Provisional Application No. 60/794,742, filed 25 Apr. 2006, both of which are incorporated herein by reference.

BACKGROUND

The present invention relates generally to wireless communication devices, and more particularly to performance testing for wireless communication devices.

Point-to-multipoint services enable wireless networks to simultaneously transmit a message from a source location to multiple wireless communication devices within a specific location or subscription group. Such services are popular with subscribers and providers for their ability to automatically provide sports updates, headline news, weather updates, advertisements, etc. The Multimedia Broadcast/Multicast Service (MBMS) is one example of a point-to-multipoint service for 3GPP.

As with all wireless communication services, point-to-multipoint services have performance requirements, i.e., error rate requirements including block error ratio (BLER) requirements and service data unit (SDU) error ratio (SDU ER) requirements. Therefore, wireless communication devices receiving point-to-multipoint services need to undergo performance tests. While conventional test procedures apply to many wireless communication services, they are generally incompatible with point-to-multipoint services. For example, some conventional test procedures require that the wireless communication device use a bidirectional radio bearer to enable the wireless communication device to loop-back received test data to the test system. However, wireless communication devices typically use unidirectional radio bearers for point-to-multipoint services. As a result, the wireless communication device cannot loop-back received point-to-multipoint test data. Other conventional test procedures require that the wireless communication device operate in an acknowledged mode so that the wireless communication device can indicate whether or not the test data was safely received. However, point-to-multipoint services typically operate in an unacknowledged mode, where the wireless communication device does not acknowledge or otherwise confirm safe receipt of data. Thus, there remains a need for test procedures applicable wireless communication services dependent on unidirectional radio bearers and/or unacknowledged mode operations.

SUMMARY

The present invention provides performance testing for a wireless communication device by activating a test module in the network layer of the wireless communication device during a test mode. According to one embodiment, the wireless communication device receives radio link control (RLC) data units from the test system during a test mode. A metric evaluator associated with the test module determines an error metric based on the RLC data units received at the test module. For example, the metric evaluator may comprise a counter that determines the error metric by counting either the RLC data units successfully received by the test module or the RLC data units unsuccessfully received by the test module. Alternatively, the metric evaluator may determine the error metric by determining an error rate or other performance metric associated with the received RLC data units. In either case, the test module reports the error metric to the test system.

According to another embodiment, the test module may configure a unidirectional uplink radio bearer between the wireless communication device and the test system. During the test mode, the test module receives RLC data units from the test system. A loop-back module associated with the test module returns looped-back data units to the test system using the unidirectional uplink radio bearer. The looped-back data units comprise at least a portion of the RLC data units received by the test module. In some cases, the looped-back data units comprise at least a portion of those RLC data units successfully received by the test module. The test system evaluates the looped-back data units to determine the performance metric.

DETAILED DESCRIPTION

The present invention provides a method and apparatus for testing point-to-multipoint services and other wireless communication services dependent on unidirectional radio bearers. Broadly, a wireless communication device according to the present invention activates a test module in responsive to a test activation message. During a test mode, the test module receives RLC data units from a test system via a unidirectional downlink radio bearer or a control channel. In one embodiment, the test module includes a metric evaluator that determines an error metric based on the received RLC data units. The test module reports the error metric to the test system. In another embodiment, the test module includes a loop-back module that loops-back at least a portion of the received RLC data units to the test system via a unidirectional uplink radio bearer. In either case the test system uses the information provided by the wireless communication device to evaluate the performance of the wireless communication device.

Figure 1:
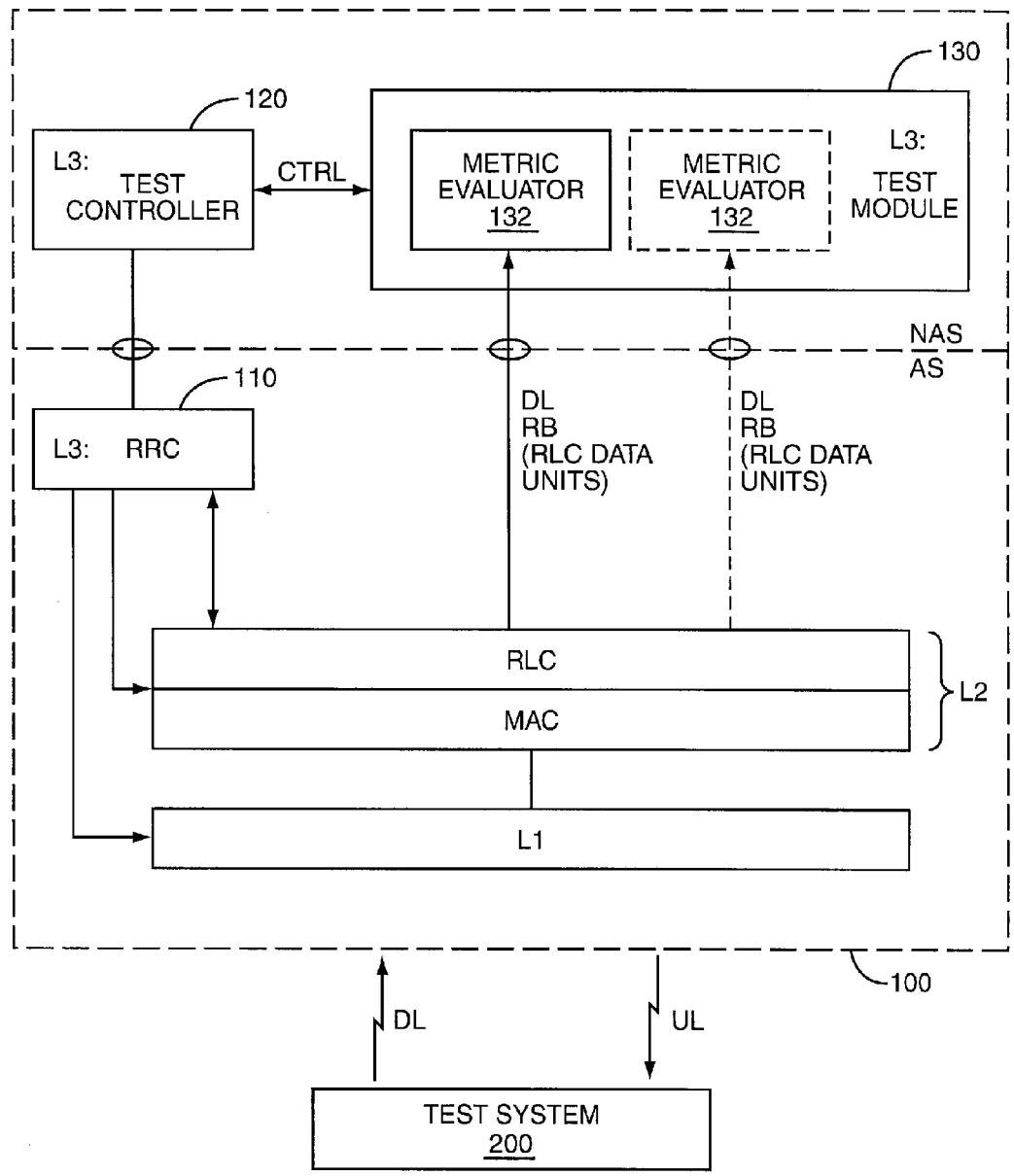
FIG. 1 shows protocol layers for a wireless communication device according to one exemplary embodiment of the present invention.

FIG. 1 shows a WCDMA (Wideband Code Division Multiple Access) protocol model for a wireless communication device 100 in communication with a test system 200. The test system 200 simulates an element of a WCDMA wireless network, such as a base station, to provide control and data information associated with performance tests for the wireless communication device 100, as discussed further below.

While shown as a stand-alone entity, it will be appreciated that the test system 200 may be part of any network device. For example, the test system 200 may be part of a base station (not shown).

The layering of the protocol model shown in FIG. 1 generally follows the Open Systems Interconnection (OSI) reference model. The protocol layers include the physical layer L1, the data link layer L2, the network layer L3, and various upper layers (not shown). Except as noted below, the entities described herein conform to the WCDMA standard. While the WCDMA protocol model is used herein to illustrate the present invention, those skilled in the art will appreciate that the present invention may also be used in wireless devices based on other standards.

The physical layer L1 provides an electrical, mechanical, and procedural interface for the transmission medium. The physical layer L1 defines the air interface and contains the communication channels by which a wireless communication device 100 communicates with the remote network device. More particularly, the physical layer L1 performs coding, modulation, and spreading of signals for transmission, and decoding, demodulation, and dispreading of received signals.

The data link layer L2 serves as a data transfer layer and includes the Medium Access Control (MAC) and Radio Link Control (RLC) sub-layers. The MAC sub-layer maps the transport channels from the physical layer L1 to logical channels that characterize the type of data transmitted, such as control channels or traffic channels. The RLC sub-layer provides transparent mode, acknowledged mode, and unacknowledged mode data transfer services for the user and control plane information of the traffic and control channels from the MAC sub-layer. The data link layer L2 uses Signaling Radio Bearers (SRBs) to transfer control plane information to the network layer L3, and Radio Bearers (RBs) to transfer user plane information to the network layer L3.

The network layer L3 is responsible for base station and mobile station communication procedures. According to the present invention, the network layer L3 includes a Radio Resource Control (RRC) sub-layer 110, test controller 120, and test module 130. The RRC sub-layer 110 provides a control interface between the data link and physical layers in the Access Stratum (AS) and the network layer L3 in the Non-Access Stratum (NAS). Generally, the RRC sub-layer 110 performs processing to set up, maintain, and release the connections necessary for communications between the wireless communication device 100 and any remote network device, including test system 200.

Test controller 120 and test module 130 provide means to execute performance tests when the wireless communication device 100 operates in a test mode. More particularly, test controller 120 controls test module 130 based on received control messages to activate the test module 130, to establish and configure elements within the test module 130, to place the wireless communication device 100 in the test mode, to deactivate the test module 130, to exit the test mode, etc. Test controller 120 may receive the control messages via the wireless interface between the wireless communication device 100 and the test system 200. Alternatively, the test controller 120 may receive the control messages via a user interface of the wireless communication device 100 or via messages received on any external interface of the wireless communication device 100.

The present invention executes performance tests while the wireless communication device 100 is in a test mode. To enter the test mode, the test system 200 sends a test activation message to the wireless communication device 100. More specifically, test system 200 configures a unidirectional downlink radio bearer between the wireless communication device 100 and the test system 200, and test controller 120 activates a test module 130 responsive to receiving the test activation message. After activating the test module 130 and configuring the unidirectional downlink radio bearer, the wireless communication device 100 transmits an activation complete message to the test system 200. Subsequently, the wireless communication device 100 operates in a test mode until the test controller 120 deactivates the test module 130.

During the test mode, the test system 200 transmits RLC data units to the wireless communication device 100 using the unidirectional downlink radio bearer. The data link layer L2 forwards the received RLC data units to the test module 130. Test module 130 evaluates the correctness of the received RLC data units using any known error detection technique, including but not limited to, cyclic redundancy check. A metric evaluator 132 in the test module 130 generates an error metric based on the evaluated data. Test module 130 reports the error metric generated by metric evaluator 132 to the test system 200 via control messages communicated to test controller 120. The test module 130 may report the error metric to the test system 200 responsive to a error metric request from the test system 200. Alternatively, the test module 130 may periodically report the error metric to the test system 200.

In one embodiment, the metric evaluator 132 may comprise a counter and the error metric may comprise a unit count that represents the RLC data units successfully (or unsuccessfully) received by the test module 130. In this embodiment, the test module 130 reports the unit count to the test system 200 via test controller 120. For example, if metric evaluator 132 counts $N_{ok}$ successfully received RLC data units, test module 130 reports $N_{ok}$ to test system 200. Alternatively, if the metric evaluator 132 counts $N_{bad}$ unsuccessfully received RLC data units, the test module 130 reports $N_{bad}$ to the test system 200. The test system 200 subsequently determines the desired performance metric(s) for the test data, such as an error rate, based on the reported unit count. For example, if test system 200 sent N RLC data units, the error rate may be computed as $N_{bad}/N$, or alternatively as $(N-N_{ok})/N$.

In another embodiment, the metric evaluator 132 computes an error rate or other performance metric, i.e., SDU ER and/or BLER. For this embodiment, the metric evaluator 132 computes the error rate based on an evaluation of the received RLC data units. The test module 130 reports the computed error rate directly to the test system 200 via test controller 120.

Figure 2:
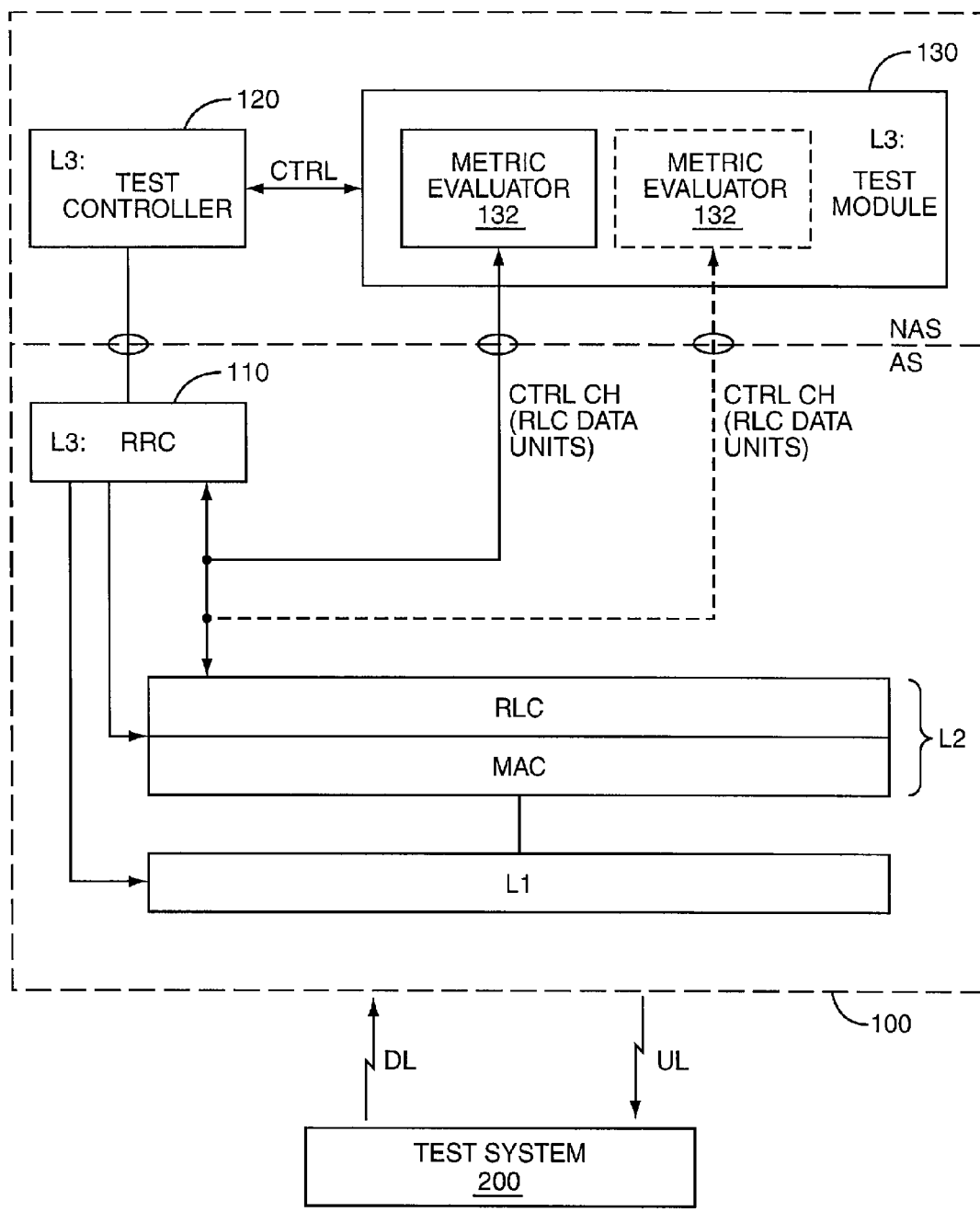
FIG. 2 shows protocol layers for a wireless communication device according to another exemplary embodiment of the present invention.

FIG. 2 shows another embodiment of the present invention that uses a control channel instead of a unidirectional downlink radio bearer to transfer the RLC data units from the data link layer L2 to the network layer L3 during the test mode. According to this embodiment, the RLC data units are included with control plane information sent to RRC sub-layer 110. As shown in FIG. 2, the RLC data units may be provided to both the test module 130 and the RRC sub-layer 110. Alternatively, the control channel information may be selectively directed to the test module during the test mode and selectively directed to the RRC sub-layer 110 during regular operating modes. In any event, the test module 130 and metric evaluator 132 process the received RLC data units as described above.

Figure 3:
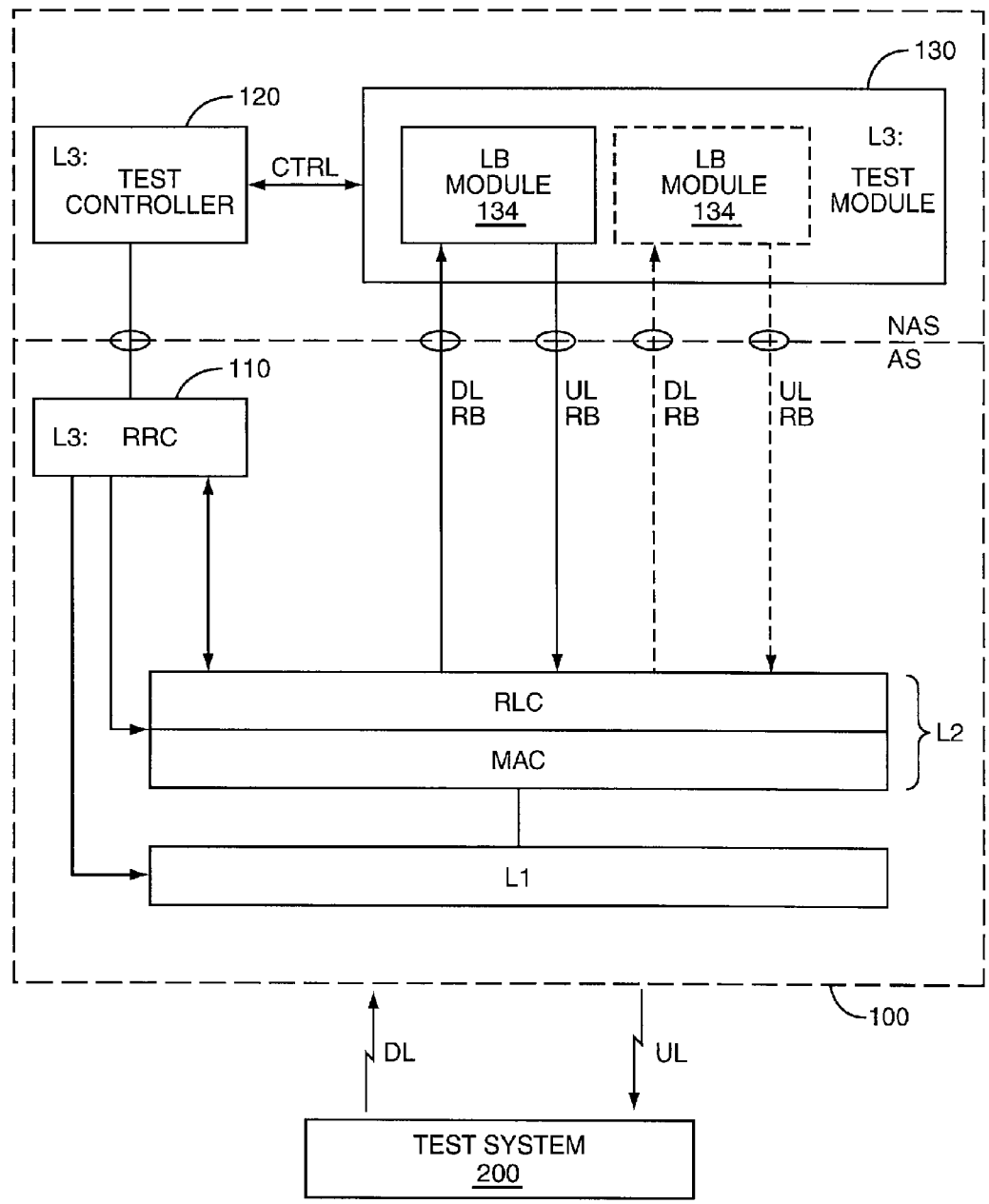
FIG. 3 shows protocol layers for a wireless communication device according to another exemplary embodiment of the present invention.
Figure 4:
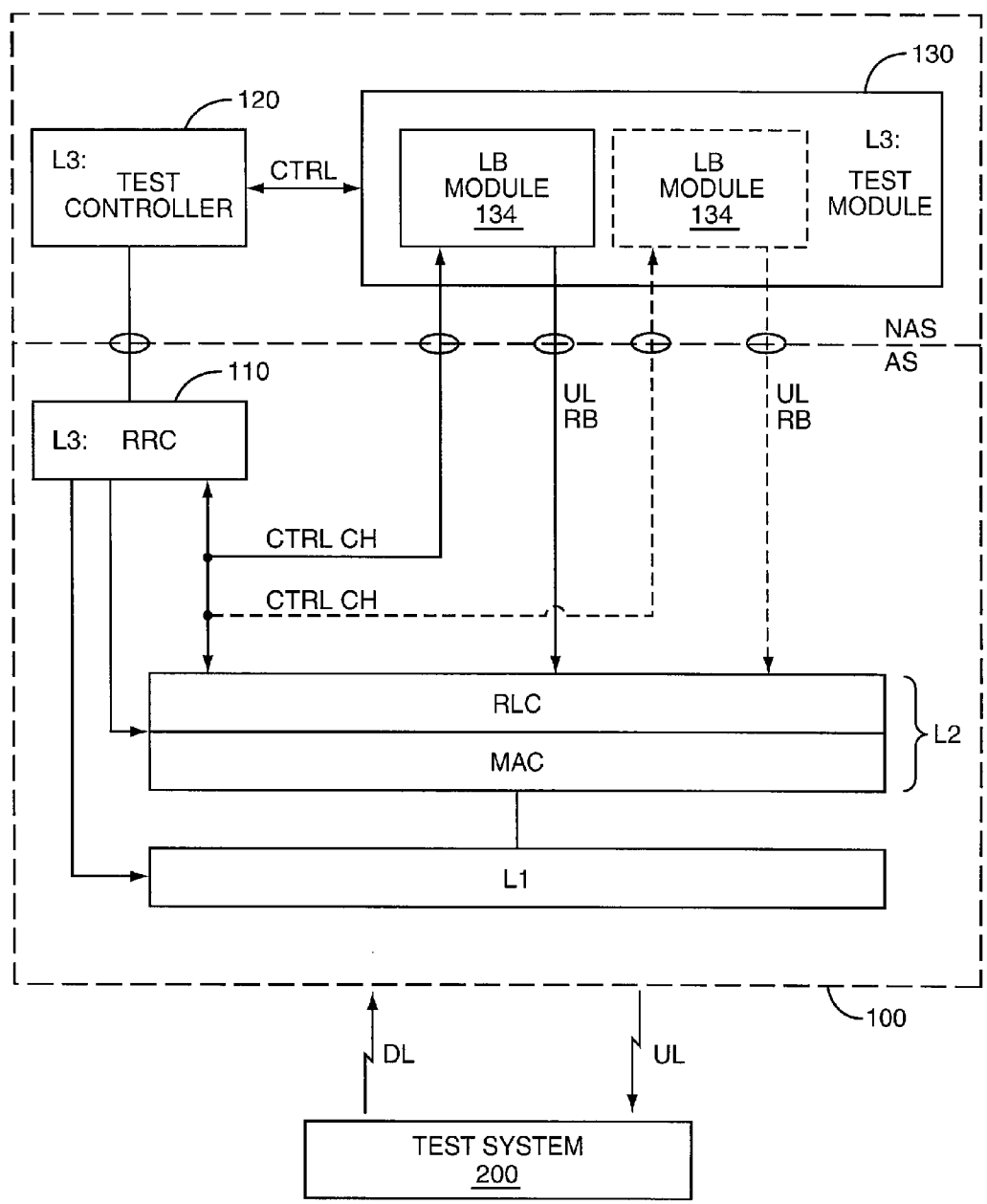
FIG. 4 shows protocol layers for a wireless communication device according to another exemplary embodiment of the present invention.

FIGS. 3 and 4 show an alternate embodiment according to the present invention. This embodiment uses the same protocol layers as the above-described embodiment. Therefore, no further discussion regarding the protocol layers is provided here.

In FIG. 3, test module 130 includes at least one loop-back module 134. The test system 200 configures via the RRC sub-layer 110 a unidirectional downlink radio bearer and a unidirectional uplink radio bearer between the wireless communication device 100 and the test system 200. Responsive to receiving a test activation message, test controller 120 activates the test module 130. The unidirectional uplink radio bearer may be any unidirectional radio bearer mapped to a Random Access Channel (RACH) or any other uplink transport channel, such as a dedicated channel (DCH). After activating the test module 130 and configuring the unidirectional downlink radio bearer and unidirectional uplink radio bearer, the wireless communication device 100 transmits an activation complete message to the test system 200. Subsequently, the wireless communication device 100 operates in a test mode until the test controller 120 deactivates the test module 130.

During the test mode, the loop-back module 134 receives RLC data units transmitted from the test system 200 via the unidirectional downlink radio bearer, and loops-back at least a portion of each successfully received RLC data unit to the test system 200 via the unidirectional uplink radio bearer. To ensure that each successfully received RLC data unit is only looped-back once, the test system 200 may use sequences of pseudo random data to fill the data portion of the transmitted RLC data unit. In this case, the pseudo random data should be unknown to the wireless communication device 100. It will be appreciated that the pseudo random sequences should change between test runs.

The portion of each received RLC data unit included in the corresponding looped-back data unit depends on the size of the looped-back data unit relative to the size of the received RLC data unit. For example, when the size of the uplink RLC data units is set equal to the size of the received RLC data units, the loop-back module 134 loops-back all of the receiver RLC data units. Further, when the size of the uplink RLC data units is set to be greater than the size of the received RLC data units, loop-back module 134 may repeat a received RLC data unit or pad it as necessary to fill the corresponding looped-back data unit. However, when the size of the uplink RLC data units is set to be less than the size of the received RLC data units, the loop-back module 134 loops back only a portion of the received RLC data units. For example, if the size of the uplink RLC data units is set to K bits, the loop-back module 134 may loop back the first K bits of each received RLC data unit.

Upon receipt of the looped-back data units, test system 200 computes an error metric based on the looped-back data units. For example, the test system 200 may evaluate and/or count the looped-back data units to determine the number of RLC data units successfully received at the test module 130 ($N_{ok}$) or the number of RLC data units unsuccessfully received at the test module 130 ($N_{bad}$). The test system 200 may then compute an error rate by computing $N_{bad}/N$, where N represents the number of RLC data units transmitted by the test system 200. Alternatively, the test system 200 may compute the error rate by computing $(N-N_{ok})/N$.

FIG. 4 shows another embodiment that uses a control channel instead of a unidirectional downlink radio bearer to transfer the RLC data units from the data link layer L2 to the network layer L3 during the test mode. For this embodiment, the loop-back module 134 receives the RLC data units via the control channel, and loops back at least a portion of the received RLC data units to the test system 200 via the unidirectional uplink radio bearer, as discussed above.

Figure 5:
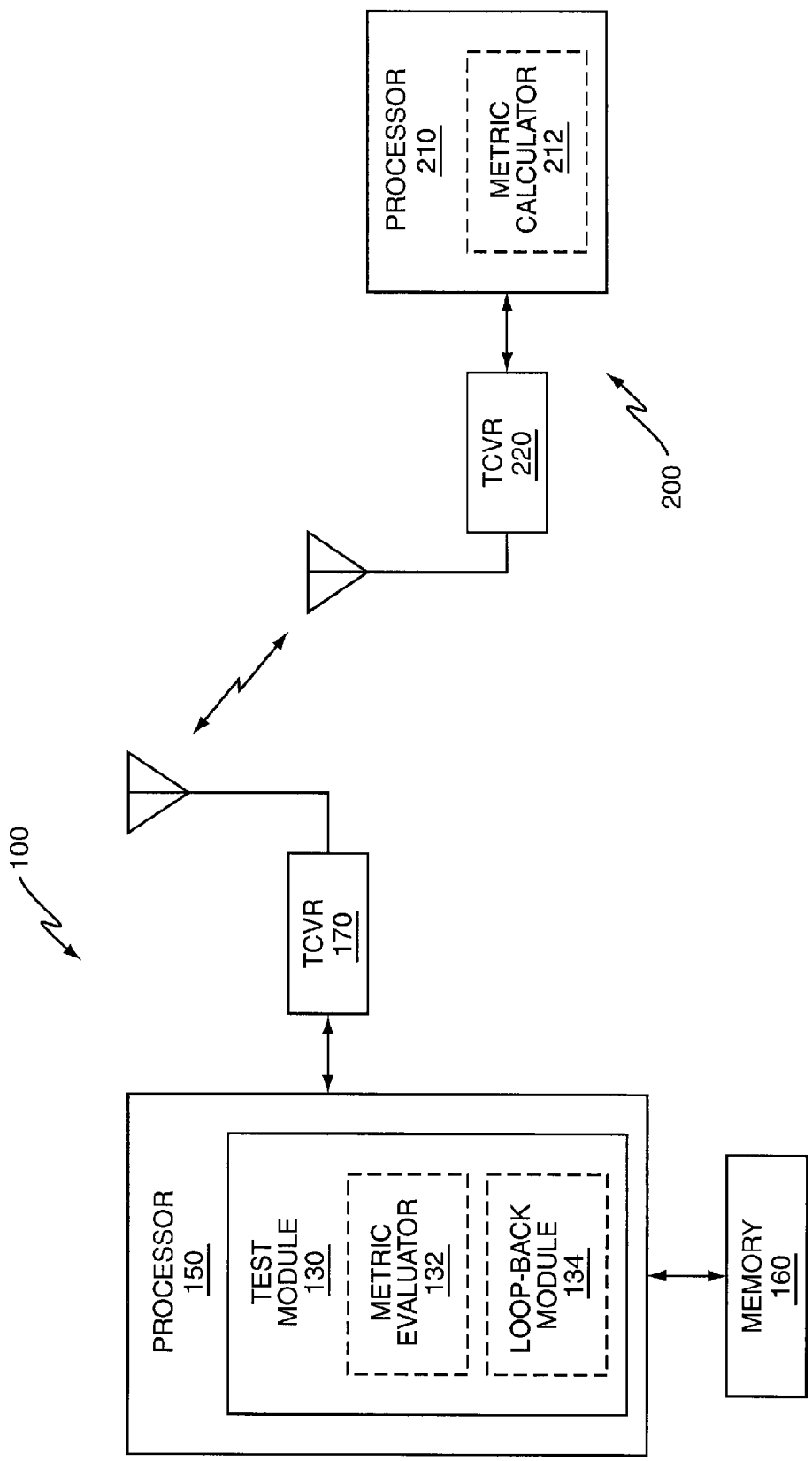
FIG. 5 shows a block diagram of a wireless communication device in communication with a test system according to the present invention.

FIG. 5 shows a block diagram of a wireless communication device 100 in communication with a test system 200 according to the present invention described above. Wireless communication device 100 comprises a processor 150, memory 160, and transceiver 170. Processor 150 controls the operation of the wireless communication device 100 according to programs stored in memory 160. In addition, processor 150 includes test module 130 that includes at least one of the metric evaluator 132 and the loop-back module 134. Transceiver 170 transmits and receives wireless signals as well understood in the art.

Test system 200 includes a processor 210 and transceiver 220. Processor 210 controls the operation of the test system 200. In addition, processor 210 may include an optional metric calculator 212 that calculates the desired performance metric(s) based on the looped-back data units or the reported unit count associated with the number of RLC data units successfully (or unsuccessfully) received by the test module 130. Transceiver 220 transmits and receives the control and data signals required for the test operations.

Figure 6:
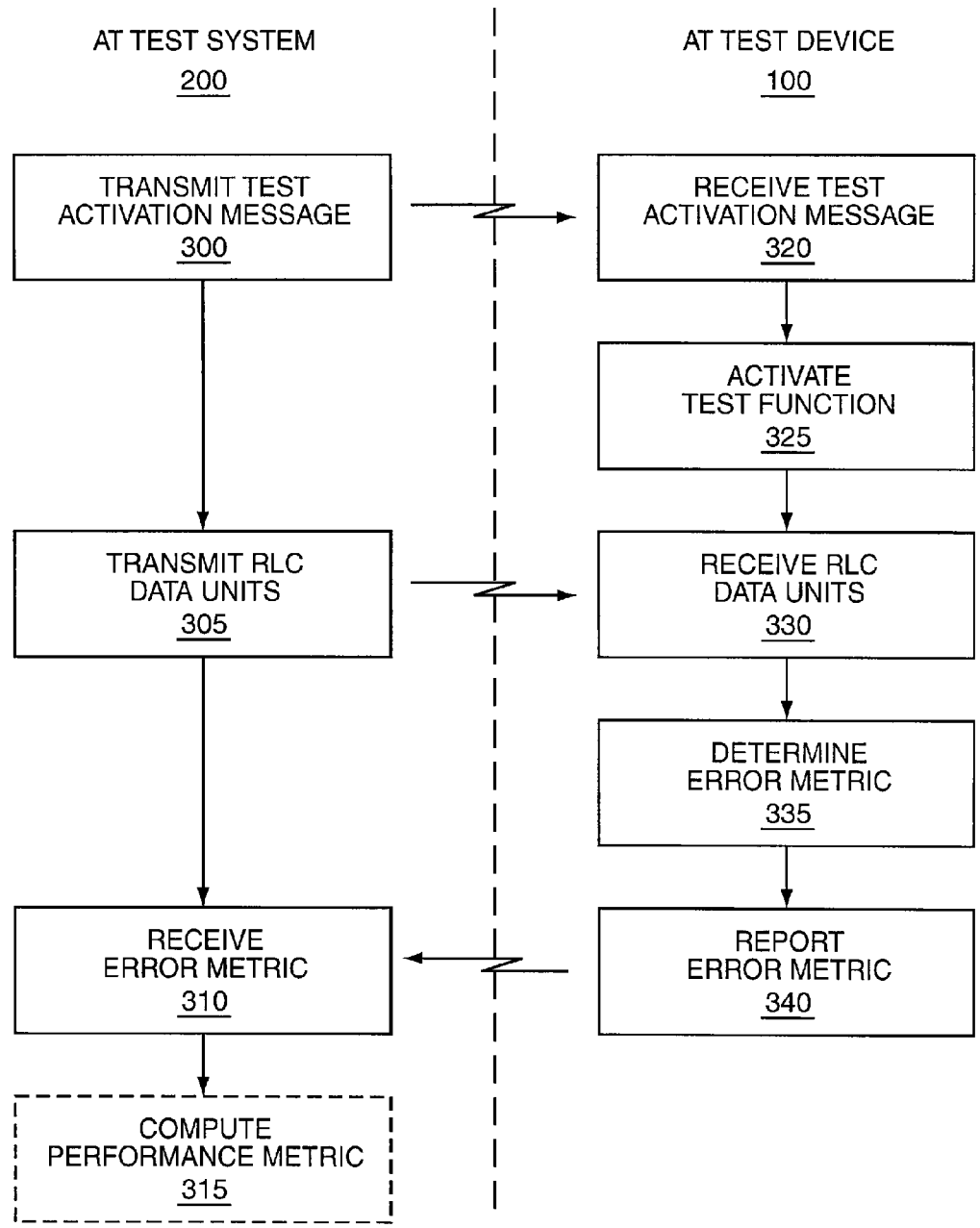
FIG. 6 shows one test process according to one exemplary embodiment.

FIG. 6 shows a flow diagram that broadly illustrates the operation of the wireless communication device 100 and test system 200 of FIG. 5 for the exemplary embodiment of FIGS. 1 and 2. To initiate test procedures, the processor 210 in test system 200 generates a test activation message, and transceiver 220 transmits the test activation message to the wireless communication device 100 (block 300). After receiving confirmation from the wireless communication device 100, the transceiver 220 transmits RLC data units generated by the processor 210 to the wireless communication device 100 (block 305). Transceiver 220 subsequently receives one or more error metrics from the wireless communication device 100 (block 310). When the error metric comprises a unit count associated with the number of RLC data units successfully (or unsuccessfully) received by the wireless communication device 100, the metric calculator 212 in processor 210 computes the desired performance metrics based on the unit count (block 315).

At the test wireless communication device 100, the transceiver 170 receives the test activation message (block 320), and the processor 150 activates the test module 130 (block 325). Subsequently, the test module 130 receives RLC data units via either a unidirectional downlink radio bearer or a control channel (block 330). The metric evaluator 132 determines the error metric as described above (block 335). The test module 130 reports the determined error metric to the test system 200 via the test controller 120 (block 340).

Figure 7:
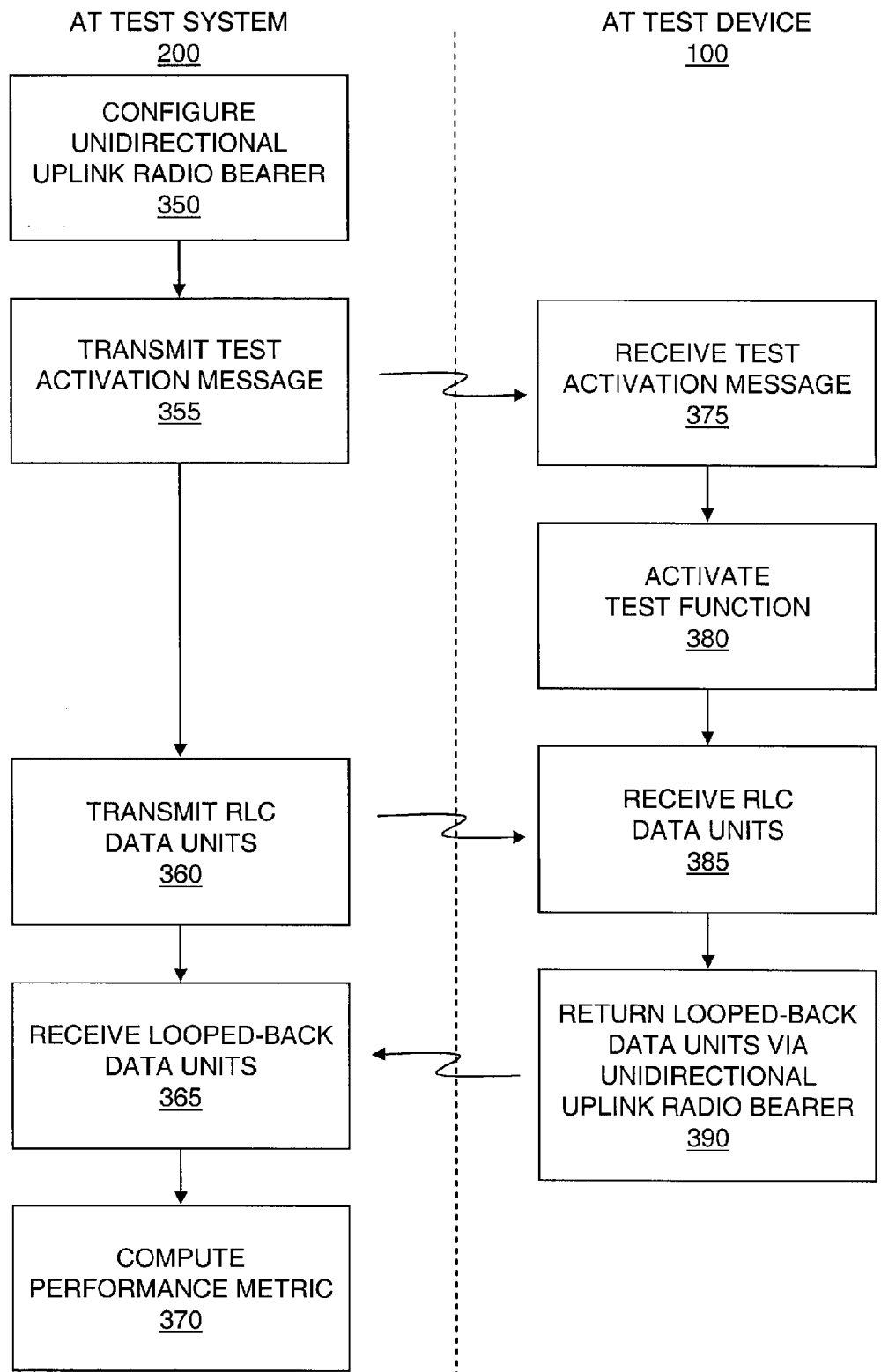
FIG. 7 shows another test process according to another exemplary embodiment.

FIG. 7 shows a flow diagram that broadly illustrates the operation of the wireless communication device 100 and test system 200 of FIG. 5 for the exemplary embodiment of FIGS. 3 and 4. To initiate test procedures, the processor 210 in test system 200 configures via the RRC sub-layer 110 a unidirectional uplink radio bearer between the wireless communication device 100 and the test system 200 (block 350), and generates a test activation message. The transceiver 220 transmits the test activation message to the wireless communication device 100 (block 355). After receiving confirmation from the wireless communication device 100, the transceiver 220 transmits RLC data units generated by the processor 210 to the wireless communication device 100 (block 360). Transceiver 220 subsequently receives looped-back data units from the wireless communication device 100 via the unidirectional uplink radio bearer (block 365). Metric calculator 212 in processor 210 computes the desired performance metric(s) based on the looped-back data units, as discussed above (block 370).

At the test wireless communication device 100, the transceiver 170 receives the test activation message (block 375). Responsive to the test activation message, the processor 150 activates the test module 130 (block 380). Subsequently, the test module 130 receives RLC data units via either a unidirectional downlink radio bearer or a control channel (block 385). The loop-back module 134 returns at least a portion of the received RLC data units via the unidirectional uplink radio bearer (block 390).

The above-described invention enables a test system to verify that the performance on a unidirectional radio bearer and/or control channel, such as those used for MBMS, meets predefined performance requirements. This in turn enables wireless service providers, including those that provide point-to-multipoint wireless services, to provide adequate coverage of the point-to-multipoint service with the required quality of service.

It will be appreciated that the above-described invention may be used for more than performance testing. The test system 200 may also be used to perform functional testing. For example, after the network hands-over control of a wireless communication device 100 from one cell to another, the test module 130 described above may be used to confirm that the wireless communication device 100 is receiving the broadcast data transmitted from the new cell. For this embodiment, the test system 200 implements either of the above-described test procedures. If the test system 200 receives any error metric or looped-back data, the test system 200 confirms that the broadcast operations are functioning properly at the wireless communication device 100.

While the above describes the invention in terms of a test module 130 having one metric evaluator 132 or one loop-back module 134, those skilled in the art will appreciate that test module 130 may include multiple metric evaluators 132 and/or loop-back modules 134 in order to run multiple tests simultaneously. Further, it will be appreciated that the test module 130 in a wireless communication device 100 may include both a metric evaluator 132 and a loop-back module 134 to enable the test system to utilize both testing options. Lastly, it will be appreciated that the wireless communication device 100 may include bidirectional radio bearers, in addition to the unidirectional radio bearers being tested, between the wireless communication device 100 and the test system 200.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of implementing performance testing of a mobile device, the method comprising:
   activating a test module of the mobile device responsive to a test activation message received from a test system;
   configuring a unidirectional downlink radio bearer between the test system and the mobile device;
   receiving radio link control (RLC) data units from the test system via the unidirectional downlink radio bearer;
   determining an error metric based on the RLC data units received by the test module; and
   reporting the error metric to the test system.

2. The method of claim 1 wherein determining the error metric comprises counting the RLC data units successfully received by the test module.

3. The method of claim 1 wherein determining the error metric comprises counting the RLC data units unsuccessfully received by the test module.

4. The method of claim 1 wherein determining the error metric comprises determining an error rate based on the RLC data units received at the test module.

5. A method of implementing performance testing of a mobile device, the method comprising:
   transmitting a test activation message to the mobile device to activate a test module of the mobile device;
   transmitting radio link control (RLC) data units to the mobile device to the test module via a unidirectional downlink radio bearer; and
   receiving at least one error metric from the mobile device indicative of errors associated with the RLC data units received by the test module.

6. The method of claim 5 wherein receiving the at least one error metric comprises receiving a unit count from the mobile station, wherein the unit count identifies how many RLC data units were successfully received at the test module.

7. The method of claim 5 wherein receiving the at least one error metric comprises receiving a unit count from the mobile station, wherein the unit count identifies how many RLC data units were unsuccessfully received at the test module.

8. The method of claim 5 further comprising calculating an error rate based on the error metric.

9. The method of claim 5 wherein receiving at least one error metric comprises receiving at least one error rate.

10. A method of implementing performance testing of a mobile device, the method comprising:
    activating a test module in the mobile device responsive to a test activation message received from a test system;
    configuring a unidirectional uplink radio bearer between the mobile device and the test system;
    configuring a unidirectional downlink radio bearer between the test system and the mobile device;
    receiving radio link control (RLC) data units from the test system via the unidirectional downlink radio bearer; and
    returning looped-back data units to the test system via the unidirectional uplink radio bearer, wherein each of said looped-back data units comprises at least a portion of the RLC data unit received by the test module.

11. The method of claim 10 wherein each RLC data unit includes pseudo-random data.

12. The method of claim 10 wherein the unidirectional uplink radio bearer is associated with a random access uplink transmission channel.

13. A mobile device comprising:
    a processor configured to activate a test module in the mobile device responsive to a test activation message received from a test system, and to configure a unidirectional downlink radio bearer between the test system and the mobile device;
    a metric evaluator associated with the test module and configured to determine an error metric based on RLC data units received from the test system at the test module via the unidirectional downlink radio bearer; and
    a transceiver configured to report the error metric to the test system.

14. The mobile device of claim 13 wherein the metric evaluator comprises a counter configured to count the RLC data units successfully received by the test module to determine the error metric.

15. The mobile device of claim 13 wherein the metric evaluator comprises a counter configured to count the RLC data units unsuccessfully received by the test module to determine the error metric.

16. The mobile device of claim 13 wherein the error metric comprises an error rate, and wherein the metric evaluator is configured to determine the error rate based on the RLC data units received by the test module.

17. A test system associated with a mobile device, said test system comprising:
a transceiver configured to:
transmit a test activation message to the mobile device to activate a test module in the mobile device;
transmit radio link control (RLC) data units to the mobile device;
transmit the RLC data units to the test module via a unidirectional downlink radio bearer; and
receive at least one error metric from the mobile device indicative of errors associated with the RLC data units received by the test module.

18. The test system of claim 17 wherein the received error metric comprises a unit count that identifies how many RLC data units were successfully received by the test module.

19. The test system of claim 17 wherein the received error metric comprises a unit count that identifies how many RLC data units were unsuccessfully received by the test module.

20. The test system of claim 17 further comprising a metric calculator configured to calculate an error rate based on the received error metric.

21. A mobile device comprising:
a processor configured to activate a test module in the mobile device responsive to a test activation message received from a test system, and to configure a unidirectional downlink radio bearer between the test system and the mobile device;
a loop-back module associated with the test module and configured to return looped-back data units via a unidirectional uplink radio bearer, wherein each of said looped-back data units comprises at least a portion of a radio link control (RLC) data unit received by the test module; and
a transceiver configured to receive the RLC data units from the test system via the unidirectional downlink radio bearer and to transmit the looped-back data units to the test system.

* * * * *